Figure 1:
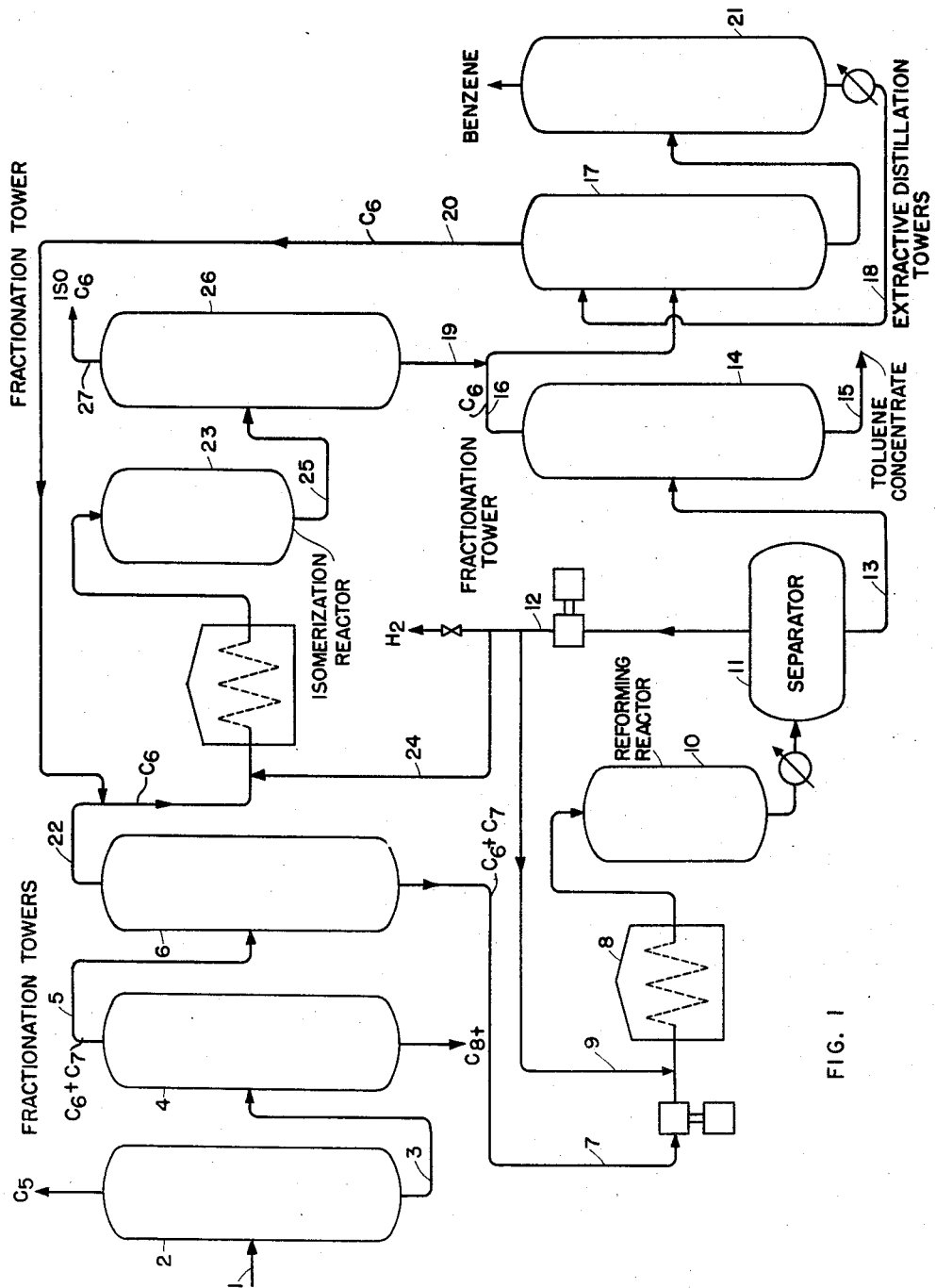
Figure 2:
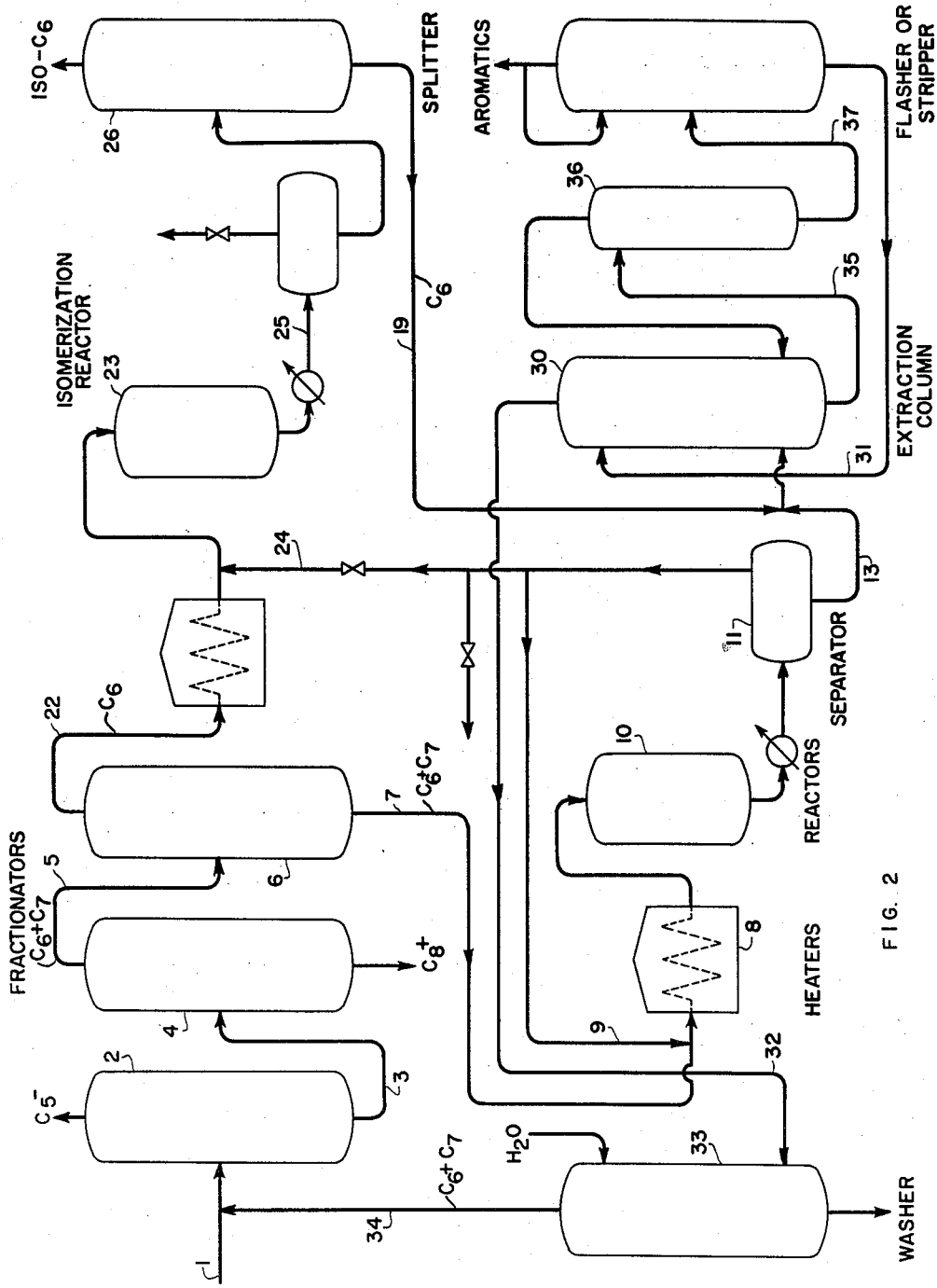

Nov. 17, 1959

D. H. SARNO 2,913,393

PROCESS FOR UPGRADING OF STRAIGHT RUN GASOLINES BY
A COMBINATION OF CATALYTIC REFORMING
AND ISOMERIZATION

Filed Feb. 18, 1958

2 Sheets-Sheet 1

INVENTOR:
DANTE H. SARNO
BY: John H. Colvin
HIS ATTORNEY

INVENTOR:
DANTE H. SARNO
BY: *John H. Colvin*
HIS ATTORNEY

United States Patent Office 2,913,393
Patented Nov. 17, 1959

2,913,393

PROCESS FOR UPGRADING OF STRAIGHT RUN GASOLINES BY A COMBINATION OF CATALYTIC REFORMING AND ISOMERIZATION

Dante H. Sarno, El Cerrito, Calif., assignor to Shell Development Company, New York, N.Y., a corporation of Delaware Application February 18, 1958, Serial No. 716,258

2 Claims. (Cl. 208—79)

This invention relates to the upgrading of straight run gasolines by a combination of catalytic reforming and isomerization.

It is common refinery practice to upgrade straight run gasoline by catalytic reforming. In this process a selected fraction of straight run gasoline is separated and passed in the vapor phases along with about 3 to 10 moles of hydrogen at a pressure of about 100 to 1000 p.s.i.g., and generally between about 300 and 700 p.s.i.g., through one or more reaction zones containing a dehydrogenation catalyst. Recently the industry has swung to catalyst comprising a small amount, e.g. 0.1 to 2% of a noble metal, e.g. Pt, Pd and Rh, supported on a suitable carrier such as alumina, alumina-silica composits and the like, and frequently promoted with small amounts, e.g. 0.1 to 3%, of chlorine and/or fluorine. However, the old reforming catalysts such as oxides and sulfides of Co, Ni, Cr, Mo and W may be used.

The chief reaction in catalyst reforming of straight run gasoline materials is the dehydrogenation of naphthenic hydrocarbons to the corresponding aromatic hydrocarbons. Next in importance is the more or less selective cracking of low octane number high molecular weight paraffins. Isomerization of paraffins and dehydrocyclization also take place to minor extents. The main dehydrogenation reaction is limited by a thermodynamic equilibrium which is not too favorable under the hydrogen pressures used. In order to make the thermodynamic equilibrium favorable to the desired dehydrogenation it is essential to effect the reforming operation at high temperature. The temperatures used (above about 850° F. and usually between 900° F. and 1000° F.) are in fact about the maximum temperatures that can be used without excessive thermal cracking of the feed in the preheating coils, transfer lines, etc.

The maximum temperature that can be used depends somewhat on the boiling range of the feed stock since feed stocks having high molecular weight components are more susceptible to thermal cracking and consequently are processed at lower temperatures than narrow boiling fractions of lower molecular weight. Consequently it is frequently the practice to separate the straight run gasoline into a $C_6$–$C_7$ fraction which is reformed under severe conditions and a heavier fraction containing $C_8$ and higher hydrocarbon which is reformed under somewhat milder conditions.

It is known that little is to be gained by including open chain hexanes in the feed stock in such catalytic reforming. Inclusion of normal hexane increase the amount of material to be processed and lowers the octane number of the final product. The hexanes, if included, undergo isomerization, but only to a slight extent because the isomerization equilibrium is most unfavorable at the temperatures in question. Most of the normal hexane therefore passes through unchanged or is cracked to gases. On the other hand, the cyclohexane is a desirable feed component since it is converted cleanly and almost completely to benzene which is a most desirable product. It is therefore desirable to split the feed stock between the boiling points of normal hexane (156° F.) and cyclohexane (177° F.) i.e. to include in the reforming feed the cyclohexane and $C_7$ hydrocarbons and to exclude the material boiling below cyclohexane. The cut point is preferably between about 160° F. and 175° F.

While it is disadvantageous to include normal hexane in the reforming feed, this material may be isomerized in a separate treatment at a lower temperature. At lower temperatures the isomerization equilibrium is more favorable to the branched chain isomers. The isomerization may be effected with the same above-described noble metal catalysts at temperatures between 650° F. and 800° F. in the presence of hydrogen. The hydrogen acts merely to preserve the life of the catalysts and may be used in lesser amounts e.g. 0.5 to 5 moles per mole of hydrocarbon. The pressure is not critical. While the isomerization equilibrium is improved at these lower temperatures it is still not very favorable and consequently in order to obtain a product of a reasonably high octane number it is necessary to fractionate the products to separate out the lower boiling isomers and to recycle the remainder.

Using the two described processes there is thus obtained an isohexane fraction of good quality and a catalytically reformed $C_6$–$C_7$ product containing benzene and toluene which can be recovered by conventional methods and when blended with the isohexane fraction produce a gasoline blend of very high octane number.

The above-described combination process, as desirable as it might appear, suffers a disadvantage. In fractionating the straight run material to separate the desired fraction containing normal hexane from the high boiling fraction containing cyclohexane and $C_7$ hydrocarbons, a small amount of methylcyclopentane is included in the lower boiling fraction. Under the conditions prevailing in the isomerization zone this material is partly isomerized and dehydrogenated to benzene. This hydrocarbon accumulates in the recycled normal hexane stream and in so doing hinders the further reaction of methylcyclopentane, increases the process load, and necessitates withdrawing a bleed stream of low value.

The present invention provides an improved combination of these two described processes involving treatment of the described fractions in such a manner that these disadvantages are eliminated. The process is described in detail in connection with the accompanying drawings in which Fig. I shows a flow diagram of the preferred operation in which the aromatics are recovered from the product by extractive distillation and Fig. II shows an alternative flow diagram in which liquid-liquid extraction is used. In the two figures like apparatus and flow lines are designated by the same reference numbers.

Referring to Fig. I, straight run gasoline entering by line 1 is sent to fractionator 2 which is operated as a depentanizer. The pentanes and lighter material are removed overhead and the remainder is passed by line 3 to fractionator 4 wherein it is separated into a $C_6$–$C_7$ fraction having an initial boiling point between about 95 and about 150 and an end point between about 210° F. and 240° F. which is removed overhead by line 5. The bottoms from the fractionator 4 are preferably catalytically reformed separately but since this operation is not part of the invention it is not shown.

The fraction removed overhead from fractionator 4 is passed to fractionator 6 which is operated to separate the material into an overhead fraction containing the normal hexane and having a final boiling point between about 160° F. and 175° F. and a bottom fraction containing cyclohexane and $C_7$ hydrocarbons and having an initial boiling between about 160° F. and 175° F. This bottom fraction is passed by line 7 through the reheater 8 wherein it is heated up to a reforming temperature above 850° F., e.g. 960° F. in the presence of hydrogen introduced by line 9. The heated mixture is then passed through the catalytic reforming reactor 10 containing one of the above-mentioned reforming catalysts. Typical conditions in reactor 10 are as follows:

Catalyst _____ 0.67 Pt, 0.37 Cl. 0.4% F/Al₂O₃.
Temperature _____ 900–960° F.
Pressure _____ 200–400 p.s.i.g.
H₂/hyc _____ 4:1.
LHSV _____ 5.

The product from reactor 10 is cooled to condense the normally liquid hydrocarbons and passed to a separator 11. Gas consisting largely of hydrogen is removed by line 12 and part thereof is recycled by line 9. The liquid product from separator 11 is passed by line 13 to a fractionator 14 which is operated in such a manner known in the art to separate an overhead fraction containing the benzene from a higher boiling fraction containing the toluene. The cut point may range from about 180° F. to about 225° F. This latter fraction which is removed by line 15 may be blended as such in gasoline or may be treated to recover substantially pure toluene. The overhead fraction from fractionator 14 is passed by line 16 and contains the benzene along with other C₆ hydrocarbons. In a typical case the temperature of the overhead from fractionator 14 is 200° F., the bottoms temperature is 270° F., and the bottoms pressure is 19.5 p.s.i.g. The overhead fraction is passed by line 16 to extractive distillation column 17. Phenol in a ratio of about 2 to 4 volumes per volume of hydrocarbon feed is introduced into column 17 near the top by line 18. In a typical case the top temperature is 175° F., the bottoms temperature is 340° F., and the bottoms pressure is 13.5 p.s.i.g. Along with the fraction passed by line 16 there is introduced a second fraction by line 19. This fraction contains unreacted normal hexane from the isomerization treatment. The overhead product from column 17 consists essentially of normal and incompletely isomerized hexane. This is passed by line 20 to the isomerization section as will be described. The bottoms product from line 17 consisting of benzene and phenol is passed to the stripping tower 21 which is operated to remove benzene overhead and phenol as bottoms product. The phenol is partly cooled and returned to column 17. In a typical case the temperature of the overhead is 190° F., the temperature of the bottoms of the column is 380° F., and the bottoms pressure is 8.5 p.s.i.g.

Returning to column 6 the overhead fraction withdrawn by line 22 is heated to a reaction temperature in the range stated e.g. 800° F., and passed through reactor 23. Hydrogen in a mole ratio of about 1 to 1 is introduced by line 24. The reactor 23 is filled with an isomerization catalyst such as described above e.g. 0.7% platinum and 2.1% fluorine deposited on alumina. The product from reactor 23 is passed by line 25 to fractionation column 26 which is operated to remove isohexane (predominantly dimethyl butane and some 2-methyl pentane) as overhead product. The cut point is between about 135° F. and 145° F. This fraction removed by line 27 is blended in the finished gasoline. The bottoms product containing normal hexane and 3-methyl pentane and the remaining 2-methyl pentane is withdrawn by line 19 and combined with the overhead from fractionating column 14. The overhead material from column 17 is passed by line 20 and combined with the overhead from fractionating column 6 in line 22.

While the raffinate fraction removed from the extractive distillation column is shown combined with lower boiling straight run fractions in line 22, it may be combined with the lower boiling straight run material at any point ahead of the isomerization reaction. Also while the higher boiling isomerizate stream is combined with the lower boiling reformate fraction in line 16, it may be combined with this material at any point ahead of the extractive distillation column 17 including for instance lines 13 or 7.

The operation illustrated in Fig. II is similar to that just described and illustrated in Fig. I but differs in the method of processing the reformed product withdrawn from the separator 11 by line 13. In this operation this reformate is passed to an extraction column 30. A suitable solvent for aromatic hydrocarbons, e.g. diethylene glycol plus water, sulfolane, sulfur dioxide, dipropylene glycol, is introduced into the extraction column 30 by line 31. In a typical case the solvent is continuously adjusted by means not shown to consist of 35% dipropylene glycol, 8.7% water and 56.6% diethylene glycol. Column 30 may advantageously be a rotary disc contactor (Petroleum Refiner, 34, No. 9, p. 129 (1955)). The paraffinic raffinate withdrawn at the top by line 32 is passed to a washer 33 wherein it is scrubbed with water to remove traces of solvent. The solvent free raffinate is then passed by line 34 to the feed inlet. Handling in this manner prevents build-up of polymers or the high boiling products in the reforming system.

The fat solvent withdrawn from the bottom of the extraction tower by line 35 is passed to a small distilling column 36 which passes overhead a small amount of material which is returned to the bottom of the tower 30 to serve as backwash. The remaining fat solvent is passed by line 37 to a flashing or stripping column 38 wherein the aromatic product is recovered from the solvent. The lean solvent is then returned to the extraction column.

I claim as my invention:

1. In a process for upgrading of straight run gasoline by catalytic reforming and catalytic isomerization, the combination of steps comprising fractionating straight run gasoline into a first straight run fraction having an initial boiling point between 95–150° F. and a final boiling point between 160–175° F., and a second straight run fraction having an initial boiling point between 160–175° F. and a final boiling point between 210–240° F., catalytically reforming said second straight run fraction at a temperature between 850 and 1000° F. in the presence of added hydrogen and a dehydrogenation catalyst, fractionating the product of said reforming into a first reformed fraction boiling below about 185–225° F. and a second reformed fraction boiling above 185–220° F., extracting said first reformed fraction along with a higher boiling isomerizate fraction to be described under conditions to produce a paraffinic raffinate and an aromatic extract, combining at least a part of said paraffinic raffinate with said first straight run fraction and isomerizing the mixture in the presence of hydrogen at a temperature between about 650 and 850° F. with a noble metal isomerization catalyst, fractionating the resulting isomerizate into a lower boiling isomerizate fraction boiling up to about 135–145° F. and a higher boiling isomerizate fraction boiling above about 135–145° F. and combining said higher boiling isomerizate fraction with said first reformed fraction as aforesaid.

2. In a process for upgrading of straight run gasoline by catalytisc reforming and catalytic isomerization, the combination of steps comprising fractionating straight run gasoline into a first straight run fraction having an initial boiling point between 95–150° F. and a final boiling point between 160–175° F., and a second straight run fraction having an initial boiling point between 160–175° F. and a final boiling point between 210–240° C., catalytically reforming said second straight run fraction at a temperature between 850 and 1000° F. in the presence of added hydrogen and a dehydrogenation catalyst, fractionating the product of said reforming into a first reformed fraction boiling below about 185–225° F. and a second reformed fraction boiling above 185–220° F., extractively distilling said first reformed fraction along with a higher boiling isomerizate fraction to be described under conditions to produce an overhead paraffinic raffinate and an aromatic concentrate as bottom product, combining at least a part of said paraffinic raffinate with said first straight run fraction and isomerizing the mixture in the presence of hydrogen at a temperature between about 650 and 850° F. with a noble metal isomerization catalyst, fractionating the resulting isomerizate into a lower boiling isomerizate fraction boiling up to about 135–145° F. and a higher boiling isomerizate fraction boiling above about 135–145° F. and combining said higher boiling isomerizate fraction with said first reformed fraction as aforesaid.

References Cited in the file of this patent

UNITED STATES PATENTS

| | | |
|---|---|---|
| 2,443,607 | Evering | June 22, 1948 |
| 2,651,597 | Corner et al. | Sept. 8, 1953 |
| 2,799,627 | Haensel | July 16, 1957 |